United States Patent [19]

Bartoszek-Loza et al.

[11] Patent Number: 5,002,975

[45] Date of Patent: Mar. 26, 1991

[54] PHOTOCURABLE COATING COMPOSITIONS

[75] Inventors: Rosemary Bartoszek-Loza, Solon; Richard J. Butler, Euclid, both of Ohio

[73] Assignee: The Standard Oil Company, Cleveland, Ohio

[21] Appl. No.: 289,567

[22] Filed: Dec. 23, 1988

Related U.S. Application Data

[63] Continuation-in-part of Ser. No. 112,325, Oct. 23, 1987, abandoned, which is a continuation of Ser. No. 689,278, Jan. 7, 1985, abandoned.

[51] Int. Cl.$^5$ .............................. C08F 2/50; C08F 3/28
[52] U.S. Cl. ......................................... 522/14; 522/37; 522/44; 522/46; 522/116; 522/117; 522/125; 522/130
[58] Field of Search ............... 522/116, 125, 117, 130, 522/46, 37, 44, 14

[56] References Cited

U.S. PATENT DOCUMENTS

| | | | |
|---|---|---|---|
| 3,090,664 | 5/1963 | Cline et al. | 8/115.5 |
| 3,943,103 | 3/1976 | Borden et al. | 260/47 UA |
| 3,977,954 | 8/1976 | Needles et al. | 204/159.12 |
| 4,276,136 | 6/1981 | Gruber et al. | 204/159.22 |
| 4,374,948 | 2/1983 | Adams et al. | 524/516 |
| 4,379,875 | 4/1983 | Samuels et al. | 524/104 |
| 4,384,026 | 5/1983 | Moore et al. | 428/412 |

FOREIGN PATENT DOCUMENTS 2107334A 4/1983 United Kingdom .

*Primary Examiner*—Jacob Ziegler
*Attorney, Agent, or Firm*—Larry W. Evans; Joseph G. Curatolo; Teresan W. Gilbert

[57] ABSTRACT

Liquid, photocurable coating compositions containing nitrile copolymers. Such compositions comprises from about 10 percent to about 60 percent by weight of a high nitrile copolymer, containing at least about 70 percent by weight of a nitrile polymer; from about 30 percent to 90 percent by weight of a photopolymerizable solvent for the high nitrile copolymer, wherein the photopolymerizable solvent is selected from the group consisting of N-vinyl pyrrolidone, cyanoethylacrylate, styrene, N,N-dimethylacylamide, N,N-methylenebisacrylamide, gamma-butyrolactone and combinations thereof, and from about 0.1 percent to about 10 percent by weight of a photoinitiator soluble in the photopolymerizable solvent for curing the high nitrile copolymer with the incorporation of at least 50 percent by weight of the solvent therein upon exposure to ultraviolet radiation, having a wavelength of from about 2000 Å to 14,000 Å, wherein the photoinitiator is selected from the group consisting of benzophenone, benzyl and benzoin ethyl ether and combinations thereof and ethyldiethanolamines in combination therewith.

10 Claims, No Drawings

PHOTOCURABLE COATING COMPOSITIONS

CROSS-REFERENCE TO RELATED APPLICATIONS

This is a continuation-in-part of U.S. Ser. No. 112,325 filed Oct. 23, 1987, which, in turn, was a continuation of U.S. Ser. No. 689,278 filed Jan. 7, 1985, now abandoned.

TECHNICAL FIELD

The present invention is directed generally toward photocurable compositions for use as protective surface coatings on various substrates such as metal, wood, plastic and paper. The coating compositions of the present invention comprise high nitrile-containing copolymer resins, a photopolymerizable solvent and a photoinitiator. The content of nitrile polymers in the copolymer is at least about 70 percent by weight. Because the solvent and photoinitiator may become incorporated into the coating, several of the coating compositions are essentially 100 percent active, that is, the solvent does not evaporate to leave a coating of only the copolymer resin, but rather the entire composition becomes the coating upon curing.

BACKGROUND OF THE INVENTION

Many varieties of coating compositions have been used in the past based on various polymeric materials. These coatings are either solvent borne or water borne. Solvent borne coatings are disadvantageous in that large amounts of volatile organic solvents are present. These solvents may be costly and hazardous. Water borne coatings are also disadvantageous in that they are not continuous and have been found to contain more pinholes and voids than the solvent borne coatings. Furthermore, the cure of these coatings often requires excessive input of thermal energy.

The search for an essentially solvent-free, non-polluting, low energy-utilizing coating process has led to the use of radiation curable coating systems. However, the hardness and adhesion of the cured film to the desired substrate has been poor because of the inherently low temperatures utilized in radiation curing of the composition.

The use of nitrile barrier latex coatings are known in the art. Representative examples of nitrile latex coating compositions and their preparation include those disclosed in U.S. Pat. Nos. 4,379,875 and 4,374,948. These patents teach that the nitrile latex coatings are thermally cured. Thermally cured nitrile latex coating processes require a high thermal energy input. Further, thermally cured coating compositions generally are 5-15 mils thick for corrosion resistant systems.

The use of photoinitiators is taught by several U.S. patents. U.S. Pat. No. 3,090,664 for instance, is directed toward a process for forming graft copolymers comprising unsaturated organic acids and nitrogen-containing polymer structure such as fibers, fabrics and films. The polymer structure is impregnated with the polymerizable organic acid and then exposed to ultraviolet light. Photoinitiators are optionally employed with or without a solvent and are contacted by the polymer substrate either before or after impregnation.

U.S. Pat. No. 3,943,103 is directed toward radiation curable polymer compositions comprising vinyl acetate and a polyfunctional reactive compound containing at least two radiation curable polymerizable olefin units.

U.S. Pat. No. 3,977,954 is directed toward a method for the formation of graft copolymers on polymeric substrates. The method includes the steps of depositing a wetting agent onto the surface of the substrate; then contacting the surface with an unhalogenated vinyl monomer vapor and a vapor of photosensitive compound in the presence of light energy.

In none of these instances has the art recognized the use of a high nitrile content copolymer with a photoinitiator and a polymerizable solvent to form a coating composition.

SUMMARY OF THE INVENTION

It is an object of the present invention to provide high nitrile copolymer resin coating compositions which are photocured at ambient temperature.

It is another object of this invention to provide thin photocurable coating compositions which are corrosion resistant and prevent metal corrosion.

It is another object of this invention to provide photocurable coating compositions having improved adhesion to various substrates.

It is another object of this invention to provide hard photocurable coating compositions.

It is still another object of the present invention to provide a non-polluting, low energy, non-solvent releasing coating system.

These and other objects, together with the advantages over known methods shall become apparent from the specification which follows and are accomplished by the invention as hereinafter described and claimed.

In general, the present invention relates to a liquid, photocurable coating composition comprising from about 10 percent to about 60 percent by weight of a high nitrile copolymer, containing at least about 70 percent by weight of a nitrile polymer, from about 30 percent to about 90 percent by weight a photopolymerizable solvent for the high nitrile copolymer wherein the photopolymerizable solvent is selected from the group consisting of N-vinyl pyrrolidone, cyanoethylacrylate, styrene, N,N-dimethylacrylamide, N,N-methylenebisacrylamide, gamma-butyrolactone and combinations thereof, and from about 0.1 percent to about 10 percent by weight of a photoinitiator soluble in the photopolymerizable solvent, for curing the high nitrile copolymer with the incorporation of the solvent therein upon exposure to ultraviolet radiation, having a wavelength of from about 2000Å to 14,000Å, wherein the photoinitiator is selected from the group consisting of benzophenone, benzyl, benzoin ethyl ether ethyldiethanol amines and combinations thereof.

The high nitrile copolymer photocurable coating compositions of this invention can be used for industrial corrosion protection of metals where coating properties such as adhesion, hardness and corrosion resistance are important. Major uses for the coatings would be in the automotive industry as primers, in the oil industry as coatings for pipelines, for photoencapsulation of electronic components and others. Further, the composition may also be used in other fields such as adhesives, sealants and the like.

DETAILED DESCRIPTION OF THE INVENTION

The photocurable coatings compositions of the instant invention are the reaction products of high nitrile copolymers, photopolymerizable solvents and photoinitiators. The coating compositions of the present invention contains high nitrile copolymers in at least from about 10 percent to about 60 percent of the total weight. More preferably, the coating compositions contains high nitrile resins in from about 20 percent to about 55 percent, and most preferably from about 30 percent to 50 percent of the total weight.

High nitrile copolymers used in this invention comprise, by weight, from at least about 70 to about 90 percent nitrile monomer, from about 5 to 29 percent monovinyl monomer, and from about 1 to 25 percent rubber component. More particularly, the nitrile polymers useful in this invention are those produced by polymerizing a major proportion of a monounsaturated nitrile, e.g., acrylonitrile, and a minor proportion of another monovinyl monomer components copolymerizable therewith, in the presence of a diene rubber which may be a homopolymer or copolymer of a conjugated diene monomer.

The high nitrile polymer compositions of the present invention can be prepared by any of the generally known techniques of polymerization including bulk polymerization, solution polymerization and emulsion or suspension polymerization by batch, continuous or intermittent addition of the monomers and other components. The preferred method is by emulsion or suspension polymerization in an aqueous medium in the presence of a free-radical generating polymerization initiator at a temperature of from about 0° C. to 100° C. in the substantial absence of molecular oxygen.

The olefinically unsaturated nitriles used in the present invention are the alpha, beta-olefinically unsaturated mononitriles having the structure:

$$CH_2=C-CN$$
$$|$$
$$R$$

wherein R is hydrogen, a lower alkyl group having from 1 to 4 carbon atoms or a halogen. Such compounds include acrylonitrile, alpha-chloroacrylonitrile, alpha-fluoroacrylonitrile, methacrylonitrile, ethacrylonitrile and the like. The most preferred olefinically unsaturated nitriles useful in the present invention are acrylonitrile and methacrylonitrile and mixtures thereof.

The monomer component copolymerizable with the olefinically unsaturated nitrile includes one or more of the esters of olefinically unsaturated carboxylic acids, vinyl esters, vinyl ethers, vinyl ketones, alpha-olefins, vinyl aromatic monomers, and others.

The esters of olefinically unsaturated carboxylic acids include those having the structure:

$$CH_2=C-COOR_2$$
$$|$$
$$R_1$$

wherein $R_1$ is hydrogen, an alkyl group having from 1 to 6 carbon atoms, or a halogen, and $R_2$ is an alkyl group having from 1 to 30 carbon atoms. Compounds of this type include methyl acrylate, ethyl acrylate, the propylacrylates, the butyl acrylates, and amyl acrylates, the hexyl acrylates, methyl methacrylate, ethyl methacrylate, the propyl methacrylates, the butyl methacrylates, the amyl methacrylates and the hexyl methacrylates, methyl alpha-chloroacrylates, ethyl alpha-chloroacrylates and the like. Most preferred in the present invention are methyl acrylate, ethyl acrylate, methyl methacrylate and ethyl methacrylate.

The alpha-olefins useful in the present invention are those having at least 4 and as many as 10 carbon atoms having the structure:

$$CH_2=C$$
$$\diagup \diagdown$$
$$R_3 \quad R_4$$

wherein $R_3$ and $R_4$ are alkyl groups having from 1 to 7 carbon atoms, and more specifically isobutylene, 2-methyl butene-1, 2-methyl pentene-1, 2-methyl hexene-1, 2-methyl heptene-1, 2methyl octene-1, 2-ethyl butene-1, 2-propyl pentene-1, 2,4,4-trimethyl pentene-1 and the like and mixtures thereof. Most preferred is isobutylene.

The vinyl ethers include methyl vinyl ether, ethyl vinyl ether, propyl vinyl ethers, the butyl vinyl ethers, methyl isopropenyl ether, ethyl isopropenyl ether and the like. Most preferred are methyl vinyl ether, ethyl vinyl ether, the propyl vinyl ethers, and the butyl vinyl ethers.

The vinyl esters include vinyl acetate, vinyl propionate, the vinyl butyrate and the like. Most preferred is vinyl acetate. The vinyl aromatic monomers include styrene, alpha-methyl styrene, the vinyl toluenes, the vinyl xylenes, indene and the like. Most preferred is styrene.

The olefinic nitrile copolymer is optionally polymerized in the presence of a preformed diene rubber which may be a homopolymer or copolymer of a conjugated diene monomer. These monomers include 1,3-butadiene, isoprene, chloroprene, bromoprene, cyanoprene, 2,3-dimethyl 1,3-butadiene, 2-ethyl 1,3-butadiene, 2,3-diethyl 1,3-butadiene and the like. Most preferred for the purpose of this invention are 1,3-butadiene and isoprene because of their ready availability and their excellent polymerization properties.

The conjugated diene monomer may be copolymerized with a comonomer selected from the group consisting of vinyl aromatic monomer, an olefinic nitrile monomer having the structure:

$$CH_2=C-CN$$
$$|$$
$$R$$

wherein R has the foregoing designation, and an ester having the structure:

$$CH_2=C-COOR_2$$
$$|$$
$$R_1$$

wherein $R_1$ and $R_2$ have the foregoing designations. The rubbery polymer contains from 50 percent to 100 percent by weight of polymerized conjugated diene monomer and from 0 percent to 50 percent by weight of a comonomer.

Preferred polymers useful in this invention are those prepared by the polymerization of 100 parts by weight of (A) from 70 percent to 90 percent by weight of at least one nitrile having the structure:

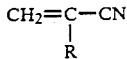

wherein R has the foregoing designation and (B) from 5 percent to 30 percent by weight based on the combined weights of (A) and (B) of at least one member selected from the group consisting of an ester having the structure:

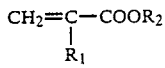

wherein $R_1$ and $R_2$ have the foregoing respective designations; and alpha-olefins having the structure:

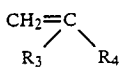

wherein $R_3$ and $R_4$ have the foregoing respective designations; a vinyl ether selected from the group consisting of methyl vinyl ether, ethyl vinyl ethers, the propyl vinyl ethers, and the butyl vinyl ethers; vinyl acetate; styrene and indene, in the presence of from 1 to 25 parts by weight of (C) a rubbery polymer of a conjugated diene monomer selected from the group consisting of butadiene and isoprene and optionally a comonomer selected from the group consisting of styrene, a nitrile monomer having the structure:

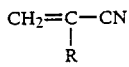

wherein R has the foregoing designation, and an ester having the structure:

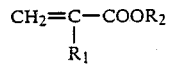

wherein $R_1$ and $R_2$ have the foregoing respective designations, said rubbery polymer containing from 50 percent to 100 percent by weight of polymerized conjugated diene and from 0 percent to 50 percent by weight of a comonomer.

The most preferred nitrile polymers are prepared by the polymerization of between 70 and 80 parts by weight of (A) and 20 to 30 parts by weight of (B) in the presence of from 5 to 15 parts by weight of (C). Thermoplastic high nitrile resins of at least 70 percent by weight of a monounsaturated nitrile and up to about 29 percent by weight of at least one other comonomer and which are rubber modified have previously been described in U.S. Pat. Nos. 3,426,102, 3,586,737, 3,763,278, the subject matter of which is incorporated herein by reference.

The second component of the coating compositions of the present invention is a photopolymerizable solvent. These solvents are any which are compatible with the high nitrile copolymer components and are generally well-known in the art. During photocure a radical induced polymerization of the solvent is triggered photochemically by exposure to irradiation. The coating compositions are classified as 100 percent solids because the photopolymerizable solvent crosslinks and is incorporated into the coating. Minor amounts of other solvents may optionally be used which may be volatile, which does not defeat the object of this invention, to provide a substantially 100 percent solid coating composition.

These photopolymerizable solvents can be employed either alone or in combination. The coating compositions generally contain, in percent of the total weight, from about 30 percent to about 90 percent, preferably from about 40 percent to about 80 percent and most preferably from about 50 percent to about 75 percent of the photopolymerizable solvent.

Types of suitable photopolymerizable solvents are selected from the group consisting of N-vinyl pyrrolidone, cyanoethylacrylate, styrene, N,N-dimethylacrylamide, N,N-methylenebisacrylamide, gamma-butyrolactone and combinations thereof.

The third component of the coating composition of the present invention is the photoinitiator. During cure the photoinitiators absorb actinic radiation, forming reactive free radical intermediates that react further with the photopolymerizable solvent and resin. A general discussion of chemical reaction initiators is available in Kirk-Othmer, Encyclopedia of Chemical Technology, Vol. 13, pp. 355-373, "Initiators", John Wiley and Sons, 1978. These photoinitiators can be employed either alone or in combination in an amount sufficient to effect the photocure of the coating composition upon irradiation. The coating composition generally contains, in percent of the total weight, from about 0.1 percent to about 10 percent by weight, preferably from about 0.1 percent to about 5 percent by weight, and most preferably from about 0.5 percent to about 2 percent by weight, of the photoinitiator.

These photoinitiator additives and the cure thereof are generally well known in the art. Examples of suitable photoinitiators include benzophenone, benzyl, benzoin ethyl ether and ethyldiethanol amines with one or more of the other photoinitiators. Ethyldiethanolamine is sometimes referred to as a synergist and while it is not useful alone as a photoinitiator, it allows curing of the coating when present with one of the other photoinitiators and in the presence of oxygen. Most preferred is benzophenone with ethyldiethanolamine.

It will be readily apparent to those skilled in the art that the coating compositions of the instant invention may be further modified by the addition of plasticizers, stabilizers, pigments, dispersants, defoamers, surfactants, extenders, filler, reinforcing agents and other film formers. The coating compositions of the instant invention may also optionally contain various flattening agents, surface active agents, thixotropic agents, UV light absorbers, flow control agents, viscosity agents, antioxidant agents and dyes. All these additives and the use thereof are well known in the art and do not require extensive discussion, it being understood that any compound possessing the ability to function in such a manner, i.e., as a flattening agent, surface active agent, UV light absorber and the like, can be used so long as they do not deleteriously affect the photocuring of the coating composition and do not adversely affect the characteristics of the coating.

In the practice of this invention, the photocurable coating compositions are first compounded by adding together the photopolymerizable solvents to form a homogeneous mixture, to which is then added the high nitrile copolymer, forming a mixture. To this mixture is added the photoinitiators, preferably in the dark, with stirring. Optionally, at any step prior to the photocure in the process, any of the aforementioned additives may be stirred into the mixture. The various components are thoroughly mixed so as to form a generally homogeneous coating composition.

A thin, relatively uniform film of coating composition is applied onto a substrate by any of the known means such as Guardco ® wet film applicator rods, knife, bar, airless spraying, dipping, roller coating, flowing, brushing, conventional and/or electrostatic spray gun, electrodeposition, and the like. The various substrates employed can be wood, paper, metal, pretreated metal, plastic and the like. Generally, the coating composition is applied in an amount sufficient to provide a dry cured coating thickness of from about 0.05 mil to about 5 mil, preferably from about 0.1 mil to about 3 mil. Optionally, multiple coats of the composition may be applied to the substrate.

The coating composition is then cured by irradiation. The light source preferably emits wavelengths in the ultraviolet spectrum from about 2,200Å to about 14,000Å. The systems used to generate ultraviolet radiation for the photopolymerization reaction can be any known in the art such as low pressure, medium pressure, high pressure, super high pressure, mercury lamps, mercury, carbon and plasma arc lamps, xenon lamps, UV light emitting diodes; UV emitting lasers and the like. The photopolymerizable coating compositions can also be cured using an electron beam apparatus.

The coating compositions are unexpectedly photocured at ambient temperature as low as about 10° with the upper temperature limits at about 100° C. where thermal cure generally begins. After UV curing, there is present on the surface of the substrate a hard, non-tacky, mar, adhesion and chemical resistant coating which tenaciously adheres to the substrate. A general discussion as to how coatings function is available in, Kirk-Othmer Encyclopedia of Chemical Technology, Vol. 7, p. 113, "Corrosion and Corrosion Inhibitors", John Wiley and Sons, Inc., 1979, and L. Blecher, D. H. Lorenz, H. L. Lowd, A. S. Wood and D. P. Wyman, "Handbook of Water-Soluble Gums and Resins", R. L. Davidson, ed., McGraw Hill, N.Y. 1980.

The high nitrile copolymer photocurable coating compositions of the present invention exhibit excellent photocurability to irradiation, long term storage stability and provide a rigid film having good bonding properties and workability after the photocuring step. By selection of components and additives the compositions may be applied both as transparent coatings and opaque coatings.

In order to demonstrate practice of the present invention, Barex 210 (B-210) was selected as the high acrylonitrile copolymer. Barex 210, a trade name for the commercial product of BP Americal, Inc., a subsidiary of bRitish Petroleum Company, is a poly(acrylonitrile-methyl acrylate-butadiene) polymer (70:21:9), parts by weight) having a number average molecular weight of 50,000.

Photocurable coating compositions, Examples No. 1 to 12, and Comparative Example B were prepared by dissolving the high nitrile copolymer in the photopolymerizable solvent by stirring. To this solution, in the dark, was added the photoinitiator system. The resulting mixture was stirred to form a homogeneous mixture of the composition.

|  | Composition | Percent by Weight |
|---|---|---|
| Example No. 1 | Barex 210 | 24.4 |
|  | N-vinyl pyrrolidone | 73.2 |
|  | Benzophenone | 2.4 |
| Example No. 2 | Barex 210 | 24.5 |
|  | N-vinyl pyrrolidone | 73.5 |
|  | Benzophenone | 0.98 |
|  | Ethyldiethanol amine | 0.98 |
| Example No. 3 | Barex 210 | 19.7 |
|  | N-vinyl pyrrolidone | 59.0 |
|  | Cyanoethylacrylate | 19.7 |
|  | Benzophenone | 0.79 |
|  | Ethyldiethanol amine | 0.79 |
| Example No. 4 | Barex 210 | 19.7 |
|  | N-vinyl pyrrolidone | 59.0 |
|  | N,N-dimethylacrylamide | 19.7 |
|  | Benzophenone | 0.75 |
|  | Ethyldiethanolamine | 0.75 |
| Example No. 5 | Barex 210 | 19.3 |
|  | N-vinyl pyrrolidone | 57.9 |
|  | N,N-dimethylacrylamide | 19.3 |
|  | Styrene | 1.9 |
|  | Benzophenone | 0.77 |
|  | Ethyldiethanolamine | 0.77 |
| Example No. 6 | Barex 210 | 17.9 |
|  | N-vinyl pyrrolidone | 53.8 |
|  | N,N-dimethylacrylamide | 17.9 |
|  | Styrene | 8.9 |
|  | Benzophenone | 0.72 |
|  | Ethyldiethanolamine | 0.72 |
| Example No. 7 | Barex 210 | 16.4 |
|  | N-vinyl pyrrolidone | 49.3 |
|  | N,N-dimethylacrylamide | 16.4 |
|  | Styrene | 16.4 |
|  | Benzophenone | 0.66 |
|  | Ethyldiethanolamine | 0.66 |
| Example No. 8 | Barex 210 | 24.2 |
|  | N,N-dimethylacrylamide | 1.4 |
|  | Benzophenone | 0.97 |
|  | Ethyldiethanolamine | 0.97 |
| Example No. 9 | Barex 210 | 24.2 |
|  | N-vinyl pyrrolidone | 72.5 |
|  | N,N-dimethylacrylamide | 1.4 |
|  | Benzophenone | 0.97 |
|  | Ethyldiethanolamine | 0.97 |
| Example No. 10 | Barex 210 | 24.2 |
|  | N-vinyl pyrrolidone | 72.5 |
|  | N,N-dimethylacrylamide | 1.4 |
|  | Benzophenone | 0.97 |
|  | Ethyldiethanolamine | 0.97 |
| Example No. 11 | Barex 210 | 24.5 |
|  | Gamma-butyrolactone | 73.5 |
|  | Benzophenone | 0.98 |
|  | Ethyldiethanolamine | 0.98 |
| Example No. 12 | Barex 210 | 39.4 |
|  | Gamma-butyrolactone | 59.1 |
|  | Benzophenone | 0.78 |
|  | Ethyldiethanolamine | 0.78 |
| Comparative Example B* | Barex 210 | 24.5 |
|  | N-vinyl pyrrolidone | 73.5 |
|  | Benzophenone | 0.98 |
|  | Ethyldiethanolamine | 0.98 |

*Cured thermally (100° C., 30 minutes)

The coating compositions of 1–12 were each applied to the surface of phosphate pre-treated steel 10×15 cm test panels. The coated panels were placed 10 to 20 cm under the ultraviolet light source and cured for the time indicated in Table I. In each case, ASTM standard adhesion (tape test), hardness (pencil) and impact testing of the coated metal substrate was conducted.

The adhesion tape test (ASTM D 3359-78) was conducted by applying a strip of Scotch Brand No. 670 tape (3M) to a cross-cut section previously made by a sharp tool in the coated substrate. The tape was then removed. The percent adhesion, of coating remaining on the substrate, was assessed on a 0–100 scale with no adhesion being 0 and 100 percent adhesion being no loss of coating.

The hardness test measures the rigidity of the organic coating applied to rigid substrates such as metal panels. The hardness tests (ASTM D 3363-74) was conducted by forcing pencil leads of increasing hardness values against the coated surface in a precisely defined manner, until one lead marred the surface. Surface hardness is defined by the hardest pencil lead which just fails to mar the coated surfaced. The test ranges are 6B to 8H with 8H being excellent, that is, the hardest lead failed to mar the coating. The impact test (ASTM D 2794-82) measures the tendency for a coating to crack after being deformed by an impacting force. A falling stainless steel ball weight hits a panel with the coated side down for the reverse impact test and the coated side up for the direct impact test. The height of the fall in continuous multiplied by the dropping weight in kilograms is the impact energy. Test ranges are 0 to 184.3 kilograms-centimeters (Kg-cm). To pass the test, a tape of standard Scotch brand is applied to the impacted area and snapped off and the coating must remain intact. A 184.3 value indicates there was no loss of coating after the tape was snapped off and 0 indicates a failure. The results are shown in Table I for each of the compositions.

exposed to the salt fog atmosphere. Test ranges are 0 to 10, with a 0 rating for all rust and a 10 rating for no appreciable rust, furthermore, the scale is logarithmic between the two extreme endpoints. The results of the salt fog testing are shown in Table II.

TABLE II

| | Percentage of Surface Rust | | | |
|---|---|---|---|---|
| | Rust Rating | | | |
| Composition | 24 hrs | 192 hrs | 408 hrs | 1050 hrs |
| 1 | 0 | — | — | — |
| 2 | 2 | — | — | — |
| 6 | 3 | — | — | — |
| 7 | 3 | — | — | — |
| 8 | 9–10 | — | — | — |
| 9 | 7 | 5 | — | — |
| 10 | 7 | 0 | — | — |
| 11 | 10 | 10 | 9 | — |
| 12 | 10 | 10 | 9 | 9 |

The results of the salt fog testing demonstrate that photocurable coating compositions provided in accordance with this invention renders protection from corrosion such that there is no appreciable rust from 25 to 1050 hours. These results exemplify the very good corrosion resistance of the coating compositions of the instant invention.

TABLE I

| Composition | Time (min) | Thickness (microns) | Adhesion % | Hardness | Direct Impact Kg-cm | Reverse Impact Kg-cm |
|---|---|---|---|---|---|---|
| 1 | 75 | 2.5–5 | 90 | 8H | 28.8 | 11.5 |
|   | 180 | 7.6–12.7 | 100 | 2H | 57.6 | 11.5 |
|   | 180 | 12.7 | 100 | HB | 115.2 | 0 |
| 2 | 130 | 2.5–5 | 100 | 8H | 28.8 | 0 |
|   | 150 | 2.5–5 | 100 | 8H | 28.8 | 0 |
| 3 | 60 | 5 | 100 | 8H | 57.6 | 0 |
|   | 120 | 5 | 100 | 8H | 57.6 | 0 |
| 4 | 60 | 5 | 100 | 8H | 34.6 | 11.5 |
|   | 90 | 2.5 | 60 | 8H | 46.1 | 11.5 |
| 5 | 120 | 10–12.7 | 95 | 8H | 34.6 | 11.5 |
| 6 | 120 | 5 | 100 | 8H | 28.8 | 0 |
| 7 | 60 | 10 | 100 | 8H | 184.3 | 57.6 |
|   | 120 | 10 | 100 | 8H | 184.3 | 57.6 |
| 8 | 60 | 10–12.7 | 100 | 8H | 86.4 | 11.5 |
| 9 | 60 | 5–10 | 100 | 8H | 46.1 | 0 |
| 10 | 60 | 5–10 | 100 | 8H | 46.1 | 0 |
| 11 | 30 | 10 | 100 | 8H | 115.2 | 115.2 |
| 12 | 30 | 1.3–1.8 | 100 | 6H | 46.1 | 11.5 |

The results of the coating compositions with varying thickness demonstrates 60 percent to 100 percent adhesion, 2H to 8H hardness with most of the test points showing excellent hardness, a 28.8 to 184.3 Kg-cm direct impact, and 0 to 115.2 Kg-cm reverse impact. These results demonstrate that the coating compositions of the instant invention show excellent adhesion, hardness and good barrier properties.

The coating compositions 1, 2, 6, 7, 8, 9, 10, 11 and 12 were also applied to the surface of phosphate, pretreated steel, 10×15 cm test panels. The coated panels were cured and tested as described above. The duplicate panels were subjected to salt exposure testing (ASTM B 117). Salt fog testing was conducted by masking with black tape uncoated portions of the panel. Then the rest of the panel was coated with the coating composition and a large X was scribed in the dried coated panel. The panel was placed in a salt-fog cabinet for a given period of time which induced accelerated corrosion testing through exposure of the specimens to a salt-fog atmosphere. A rating was given based on the degree of rusting and length of time the samples were Comparative Example B which had the same coating composition as Example No. 2 was cured by employing a thermal process. The coating composition was prepared and applied to the surface of a phosphate pretreated steel 10×-cm test panel. The coated panel was then placed in an oven at about 100° C. for 30 minutes. The ASTM standard adhesion, hardness, impact and salt fog measurements could not be carried out because the coating composition did not form, it was only a tacky film on the metal substrate.

In order to establish the percent of active components in the coating compositions of the present invention, the coated panels were weighed before and after photocuring. The results established that use of the solvent N-vinyl pyrrolidone produced no weight loss; hence, a non-solvent release, non-polluting product. When gamma-butyrolactone was employed as the solvent, approximately 30 to 50 percent by weight of the coating was lost during curing; hence, these compositions were not 100 percent active. Nevertheless, the latter compositions, Examples 11 and 12, exhibited superior rust resistance.

Based upon the foregoing results and the specification disclosed, it should be clear that the coating compositions of the present invention provide improved adhesion and corrosion protection over thermally cured compositions.

It is to be understood that the use of high nitrile copolymers is not limited to those specifically exemplified herein, or by the disclosure of typical polymer components thereof, the examples having been provided merely to demonstrate practice of the subject invention. Those skilled in the art may readily select other monounsaturated nitriles, polymerizable comonomers and rubbers according to the disclosure made hereinabove.

Thus, it is believed that any of the variables disclosed herein can readily be determined and controlled without departing from the scope of the invention herein disclosed and described. Moreover, the scope of the invention shall include all modifications and variations that fall within the scope of the attached claims.

We claim:

1. Liquid, photocurable coating compositions comprising:
    from about 10 percent to about 60 percent by weight of a high nitrile coplymer containing at least about 70 percent by weight of a nitrile polymer;
    from about 30 percent to about 90 percent by weight of a photopolymerizable solvent for said high nitrile copolymer, wherein the photopolymerizable solvent is selected from the group consisting on N-vinyl pyrrolidone, cyanoethylacrylate, styrene, N,N-dimethylacrylamide, N,N-methylenebisacrylamide, gamma-butyrolactone and combinations thereof, and
    from about 0.1 percent to about 10 percent by weight of a photoinitiator soluble in said photopolymerizable solvent for curing said high nitrile copolymer with the incorporation of at least 50 percent by weight of said solvent therein upon exposure to ultraviolet radiation, having a wavelength of from 200Å to 14,000Å, wherein the photoinitiator is selected from the group consisting of benzophenone, benzyl and benzoin ethyl ether, ethyldiethanolamines and combinations thereof.

2. The photocurable coating composition, as set forth in claim 1, wherein said high nitrile copolymer is prepared by the polymerization of 100 parts by weight of (A) from 70 percent to 90 percent by weight of at least one nitrile having the structure

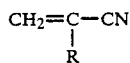

wherein R is hydrogen, a lower alkyl group having from 1 to 4 carbon atoms, or a halogen, and (B) from 5 percent to 29 percent by weight based on the combined weights of (A) and (B) of at least one member selected from the group consisting of (1) an ester having the structure

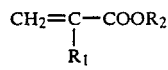

wherein $R_1$ is hydrogen, an alkyl group having from 1 to 6 carbon atoms, or a halogen, and $R_2$ is an alkyl group having from 1 to 30 carbon atoms, (2) an alpha-olefin having the structure

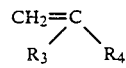

wherein $R_3$ and $R_4$ are alkyl groups having from 1 to 7 carbon atoms, (3) a vinyl ether selected from the group consisting of methyl vinyl ether, ethyl vinyl ether, the propyl vinyl ethers, and the butyl vinyl ethers, (4) vinyl acetate, (5) styrene, and (6) indene, in the presence of from 1 to 25 parts by weight of (C) a rubbery polymer of a conjugated diene monomer selected from the group consisting of butadiene and isoprene and a comonomer selected from the group consisting of styrene, a monomer having the structure

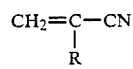

wherein R has the foregoing designation, and an ester having the structure

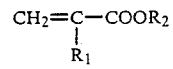

wherein $R_1$ and $R_2$ have the foregoing respective designations, said rubbery polymer containing from 50 percent to 100 percent by weight of polymerized conjugated diene and from 0 percent to 50 percent by weight of comonomer.

3. The photocurable coating composition, as set forth in claim 1, wherein said coating composition contains from about 20 percent to about 55 percent by weight of the high nitrile copolymer.

4. The photocurable coating composition, as set forth in claim 1, wherein said coating composition contains from about 30 percent to about 50 percent by weight of the high nitrile copolymer.

5. The photocurable coating composition, as set forth in claim 1, wherein said coating composition contains from about 40 percent to about 80 percent by weight of photopolymerizable solvent.

6. The photocurable coating composition, as set forth in claim 1, wherein said coating composition contains from about 50 percent to about 75 percent by weight of photopolymerizable solvent.

7. The photocurable coating composition, as set forth in claim 1, wherein said coating composition contains from about 0.1 percent to about 5 percent by weight of photoinitiator.

8. The photocurable coating composition, as set forth in claim 1, wherein said coating composition contains from about 0.5 percent to about 2 percent by weight of the photoinitiator.

9. The photocurable coating composition, as set forth in claim 1, wherein said photoinitiator is benzophenone and ethyldiethanol amine.

10. The photocurable coating composition, as set forth in claim 1, wherein said high nitrile copolymer comprises:
    70 percent by weight of polyacrylonitrile;
    21 percent by weight of polymethyl acrylate; and
    9 percent by weight of butadiene rubber.

* * * * *